(12) United States Patent
Babaei et al.

(10) Patent No.: US 10,805,953 B2
(45) Date of Patent: Oct. 13, 2020

(54) CHANNEL ACCESS PROCEDURES IN A WIRELESS NETWORK

(71) Applicant: Ofinno Technologies, LLC, Herndon, VA (US)

(72) Inventors: Alireza Babaei, Ashburn, VA (US); Esmael Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 25 days.

(21) Appl. No.: 15/425,584

(22) Filed: Feb. 6, 2017

(65) Prior Publication Data

US 2017/0231004 A1 Aug. 10, 2017

Related U.S. Application Data

(60) Provisional application No. 62/291,394, filed on Feb. 4, 2016.

(51) Int. Cl.
*H04W 74/08* (2009.01)

(52) U.S. Cl.
CPC ............... *H04W 74/0808* (2013.01)

(58) Field of Classification Search
None
See application file for complete search history.

(56) References Cited

U.S. PATENT DOCUMENTS

| 10,326,548 | B2 * | 6/2019 | Fujishiro | H04W 72/042 |
| 2005/0071682 | A1 * | 3/2005 | Kurokawa | H04W 12/0602 726/4 |
| 2010/0278087 | A1 * | 11/2010 | Kawakami | H04W 52/0216 370/311 |
| 2012/0147872 | A1 * | 6/2012 | Zisimopoulos | H04W 8/12 370/338 |
| 2012/0207089 | A1 * | 8/2012 | Kone | H04L 5/001 370/328 |
| 2014/0355534 | A1 * | 12/2014 | Vermani | H04W 16/14 370/329 |
| 2015/0009907 | A1 * | 1/2015 | Merlin | H04W 74/0808 370/329 |
| 2015/0092703 | A1 * | 4/2015 | Xu | H04L 5/003 370/329 |
| 2015/0092758 | A1 * | 4/2015 | Chen | H04W 16/14 370/336 |

(Continued)

OTHER PUBLICATIONS

3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13).

(Continued)

*Primary Examiner* — Christopher T Wyllie
(74) *Attorney, Agent, or Firm* — David Grossman; Kavon Nasabzadeh; Philip Smith

(57) ABSTRACT

A base station performs channel access procedures for transmission on the plurality of LAA cells comprising a first cell group and a second cell group. The channel access procedures comprising a first channel access procedure of a first cell of the first cell group. The first channel access procedure is dependent on a second channel access procedure of a second cell of the first cell group and is independent of a third channel access procedure of a third cell of the second cell group.

18 Claims, 13 Drawing Sheets

---

Encode TBs for transmission on LAA cells comprising a first cell group and a second cell group
1310

↓

Perform channel access procedures for transmission on the LAA cells where a first channel access procedure is dependent on other channel access procedures
1320

↓

Transmit cell(s) of the LAA cells when the channel access procedures indicate a clear channel on the cell(s)
1330

(56) References Cited

U.S. PATENT DOCUMENTS

| | | | | |
|---|---|---|---|---|
| 2015/0110065 | A1* | 4/2015 | Gaal | H04W 16/14 370/330 |
| 2015/0148053 | A1* | 5/2015 | Patel | H04W 72/0426 455/452.1 |
| 2015/0245327 | A1* | 8/2015 | Damnjanovic | H04W 16/14 370/336 |
| 2015/0256305 | A1* | 9/2015 | Yerramalli | H04W 16/14 370/311 |
| 2015/0319781 | A1* | 11/2015 | Damnjanovic | H04W 16/14 370/330 |
| 2016/0080052 | A1* | 3/2016 | Li | H04B 7/0456 375/267 |
| 2016/0100318 | A1* | 4/2016 | Wei | H04W 16/14 370/329 |
| 2016/0143014 | A1* | 5/2016 | Mukherjee | H04W 74/0816 370/330 |
| 2016/0309512 | A1* | 10/2016 | Li | H04W 74/0816 |
| 2017/0013469 | A1* | 1/2017 | Larsson | H04W 74/0808 |
| 2017/0127382 | A1* | 5/2017 | Zhang | H04L 12/1886 |
| 2017/0231004 | A1* | 8/2017 | Babaei | H04W 74/0808 |
| 2017/0303220 | A1* | 10/2017 | Sadeghi | H04W 72/042 |
| 2017/0325115 | A1* | 11/2017 | Matsumoto | H04W 24/08 |
| 2017/0347270 | A1* | 11/2017 | Iouchi | H04W 72/0406 |
| 2018/0014326 | A1* | 1/2018 | Wang | H04L 1/1812 |
| 2018/0048498 | A1* | 2/2018 | Stern-Berkowitz | H04W 16/14 |

OTHER PUBLICATIONS

3GPP TS 36.211 V13.0.0 (Dec. 2015); Technical Specification, 3rd Generation Partnership Project; Technical Specification Group Radio Access Network; Evolved Universal Terrestrial Radio Access (E-UTRA);Physical channels and modulation (Release 13).
3GPP TS 36.212 V13.0.0 (Dec. 2015), Technical Specification, 3rd Generation Partnership Project; Technical Specification Group Radio Access Network; Evolved Universal Terrestrial Radio Access (E-UTRA);Multiplexing and channel coding, (Release 13).
3GPP TS 36.213 V13.0.1 (Jan. 2016), Technical Specification, 3rd Generation Partnership Projection.
3GPP TS 36.300 V13.2.0 (Dec. 2015), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.0.0 (Dec. 2015), Technical Specification, 3rd Generation Partnership Project; Technical Specification Group Radio Access Network; Evolved Universal Terrestrial Radio Access (E-UTRA);Medium Access Control (MAC) protocol specification, (Release 13).
3GPP TS 36.331 V13.0.0 (Dec. 2015), Technical Specification, 3rd Generation Partnership Project; Technical Specification Group Radio Access Network; Evolved Universal Terrestrial Radio Access (E-UTRA);Radio Resource Control (RRC); Protocol specification, (Release 13).
3GPP TSG RAN WG1 #83, R1-156490, Nov. 15-22, 2015, Anaheim, USA, Source:Cisco Systems, Title: Views on Multi-Channel Access for LAA.
3GPP TSG RAN WG1 #83, R1-156763, Anaheim, California, US, Nov. 15-22, 2015, Source: Samsung, Title: LAA Multi-Channel LBT.
3GPP TSG RAN WG1 #83, R1-157039, Nov. 14-22, 2015, Anaheim, USA, Source: Qualcomm Incorporated, Title: Multicarrier LBT operation.
3GPP TSG RAN WG1 83 Meeting, R1-156914, Anaheim, USA, Nov. 15-22, 2015, Source: Huawei, HiSilicon, Title: Remaining LBT parameters for LAA DL.
3GPP TSG RAN WG1 Meeting #83, R1-156510, Anaheim, USA, Nov. 15-22, 2015, Source: Intel Corporation, Title: Remaining Details on LBT.
3GPP TSG RAN WG1 Meeting #83, R1-156574, Anaheim, USA, Nov. 15-22, 2015, Source: CATT, Title: Remaining details of DL LBT for LAA.
3GPP TSG RAN WG1 Meeting #83, R1-156576, Anaheim, USA, Nov. 15-22, 2015, Source: CATT, Title: DL LBT for LAA multi-carrier transmission.
3GPP TSG RAN WG1 Meeting #83, R1-156622, Anaheim, USA, Nov. 16-20, 2015, Source: National Instruments, Title: Experimental Results on Impact of Energy Detection Threshold for DL LAA.
3GPP TSG RAN WG1 Meeting #83, R1-156733, Anaheim, USA, Nov. 15-22, 2015, Source: Lenovo, Title: Contention window size adjustment for LBT Category 4 for LAA PDSCH transmission.
3GPP TSG RAN WG1 Meeting #83, R1-156856, Anaheim, USA, Nov. 15-22, 2015, Source: LG Electronics, Title: DL LBT design in LAA.
3GPP TSG RAN WG1 Meeting #83, R1-156857, Anaheim, USA, Nov. 15-22, 2015, Source: LG Electronics, Title: Multi-carrier DL TX in LAA.
3GPP TSG RAN WG1 Meeting #83, R1-157014, Anaheim, USA, Nov. 15-22, 2015, Title: Multi-carrier LBT operation for LAA, Source: Alcatel-Lucent Shanghai Bell, Alcatel-Lucent.
3GPP TSG RAN WG1 Meeting #83, R1-157166, Anaheim, California, USA, 15-22, 2015, Source: MediaTek Inc., Title: LAA LBT design.
3GPP TSG RAN WG1 Meeting #83, R1-157172, Anaheim, USA, Nov. 15-22, 2015, Source: Intel Corporation, Title: On the LAA ED threshold.
3GPP TSG RAN WG1 Meeting #83, R1-157257, Anaheim, USA, Nov. 16-20, 2015, Source: Ericsson, Title: On Remaining Details of DL LAA LBT Procedures and Parameters.
3GPP TSG RAN WG1 Meeting #83, R1-157330, Anaheim, USA, Nov. 15-22, 2015, Source: Wilus Inc., Title: Consideration on Multicarrier LBT for LAA.
3GPP TSG RAN WG1 Meeting 83, R1-156701, Anaheim, USA, Nov. 16-20, 2015, Source: Sony, Title: LAA CW size adjustment methodologies.
3GPP TSG-RAN WG1 Meeting #83, R1-157009, Anaheim, USA, Nov. 15-22, 2015, Source: Broadcom Corporation, Title: Further Discussion on LAA DL Multi-channel LBT.
3GPP TSG-RAN WG1 Meeting #83, R1-157306, Anaheim, USA, Nov. 15-22, 2015, Source: Nokia Networks, Title: Multi-carrier LBT for DL LAA.
3GPP TSG-RAN WG1 Meeting #83, R1-157379, Nov. 16-20, 2015, Anaheim, USA, Source: BlackBerry UK Limited, Title: Downlink LBT Priority Classes.

* cited by examiner

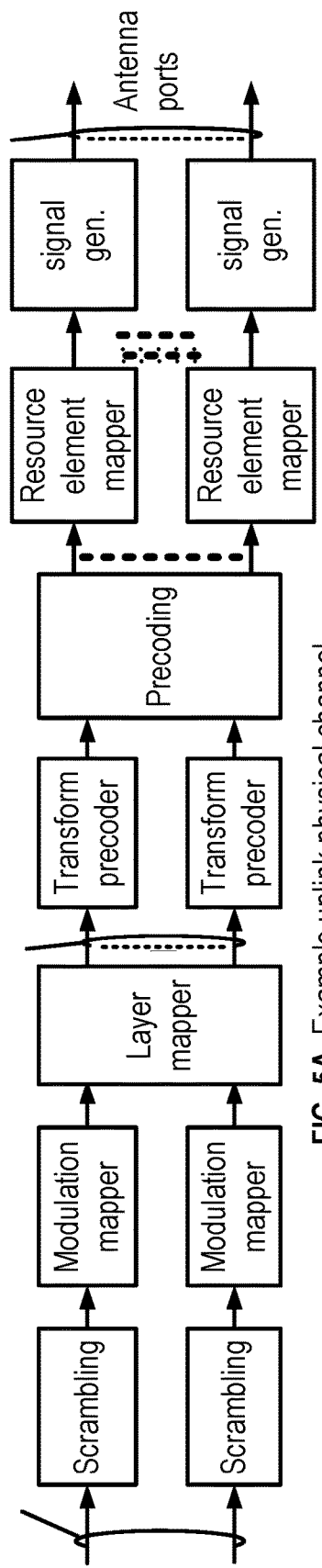
FIG. 5A Example uplink physical channel
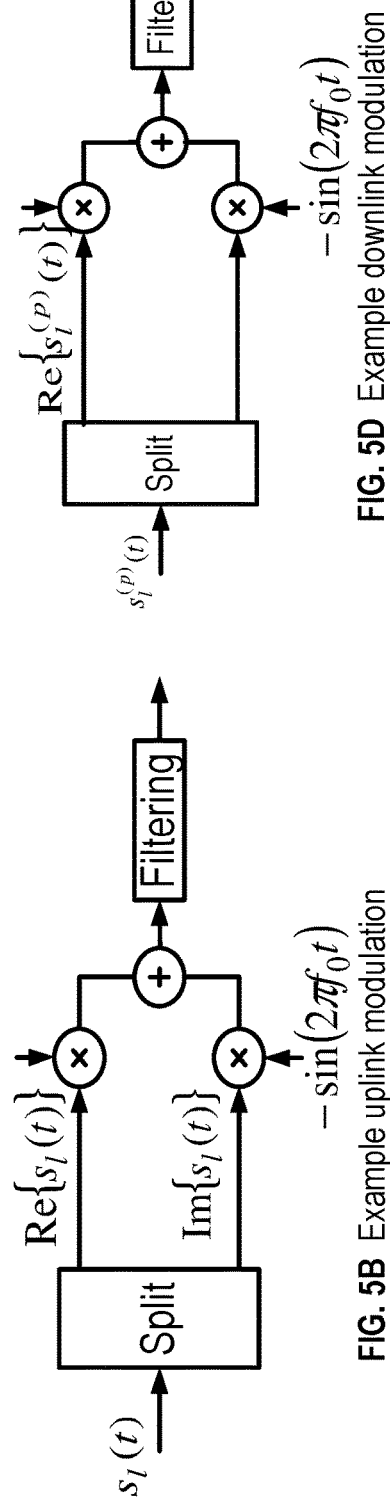
FIG. 5B Example uplink modulation
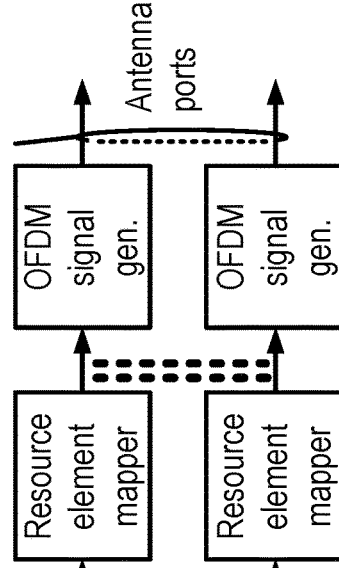
FIG. 5D Example downlink modulation
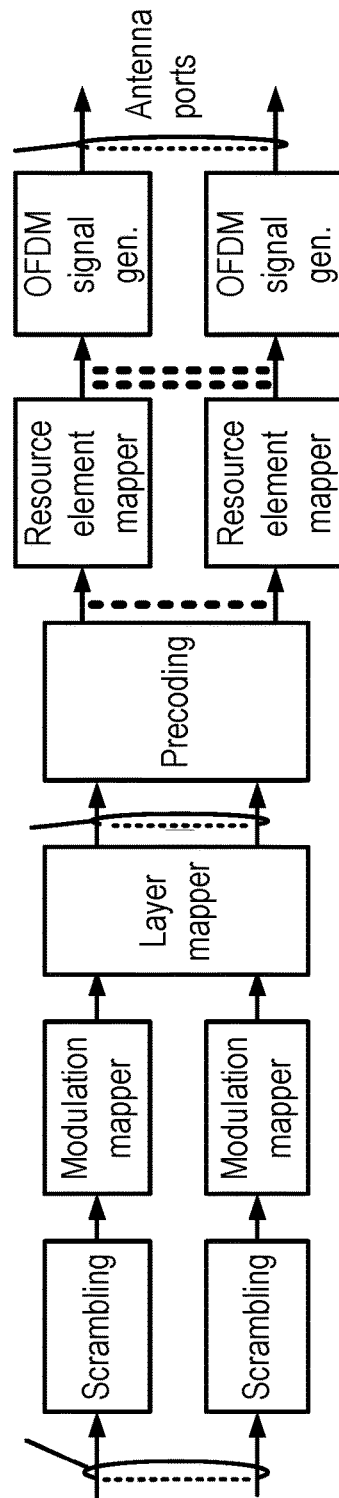
FIG. 5C Example downlink physical channel Dual-Connectivity at eNB

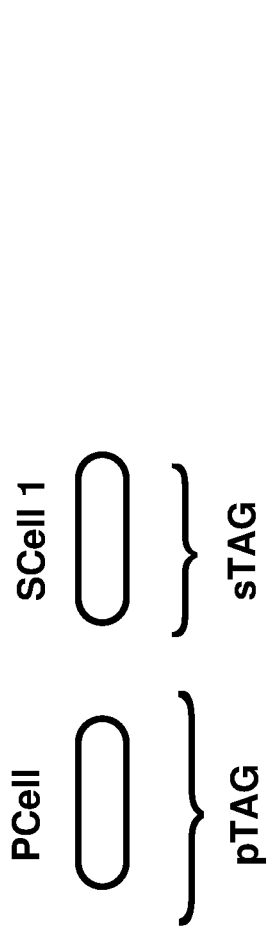
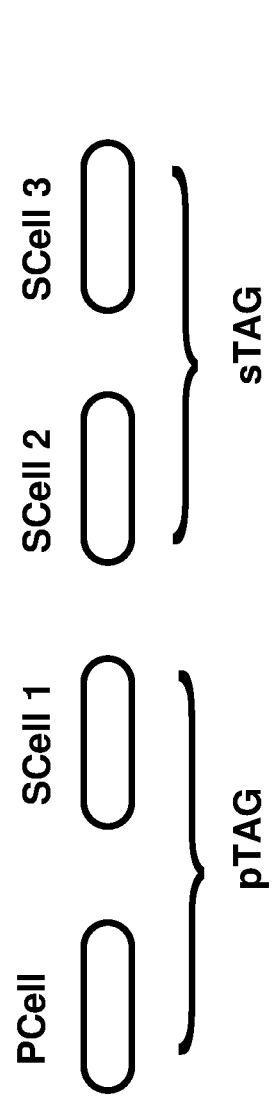
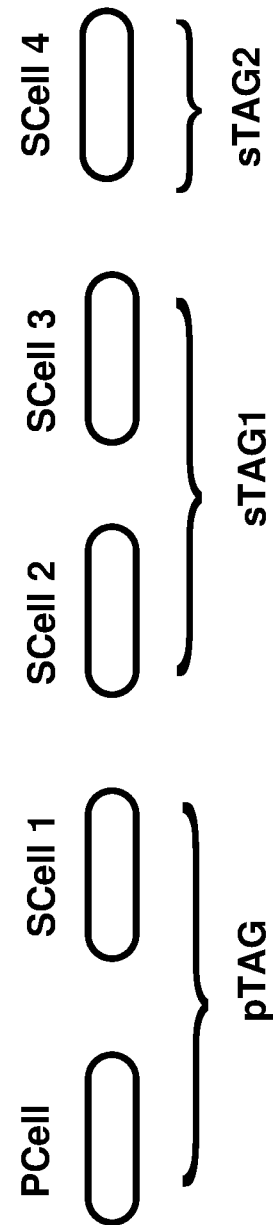
FIG. 8

Channel Access Priority Class

| Channel Access Priority Class ($p$) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255,511,1023} |

FIG. 11

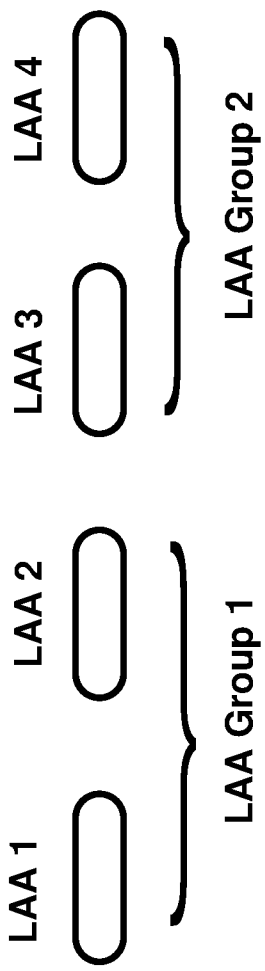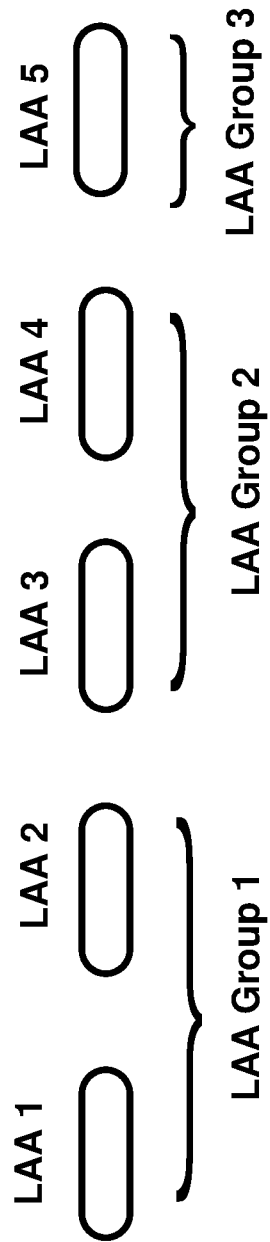
FIG. 12

CHANNEL ACCESS PROCEDURES IN A WIRELESS NETWORK

CROSS-REFERENCE TO RELATED APPLICATIONS

This application claims the benefit of U.S. Provisional Application No. 62/291,394, filed Feb. 4, 2016, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11 is an example configuration table for Channel Access Priority Classes as per an aspect of an embodiment of the present disclosure.

FIG. 12 shows examples of channel access cell grouping as per an aspect of an embodiment of the present disclosure.

DETAILED DESCRIPTION OF EMBODIMENTS

Figure 1:
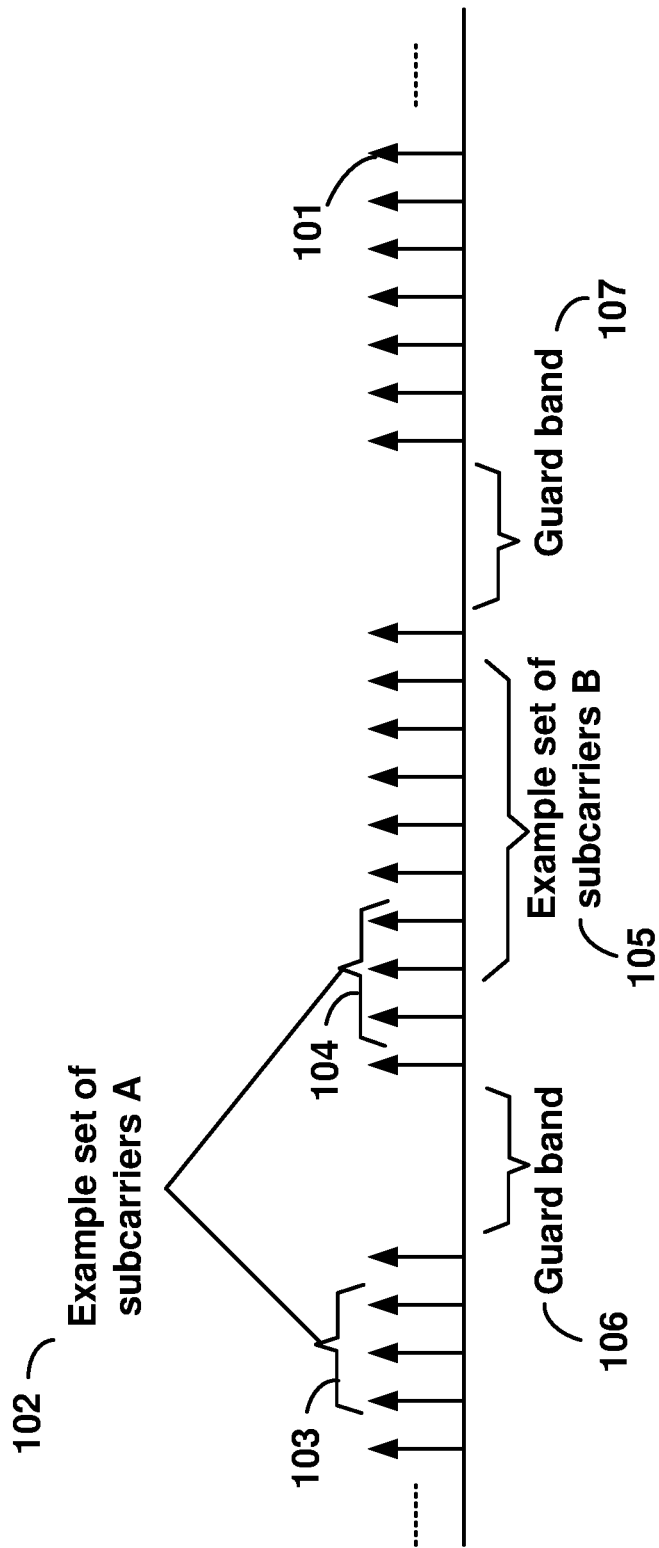
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:
  ASIC application-specific integrated circuit
  BPSK binary phase shift keying
  CA carrier aggregation
  CSI channel state information
  CDMA code division multiple access
  CSS common search space
  CPLD complex programmable logic devices
  CC component carrier
  DL downlink
  DCI downlink control information
  DC dual connectivity
  EPC evolved packet core
  E-UTRAN evolved-universal terrestrial radio access network
  FPGA field programmable gate arrays
  FDD frequency division multiplexing
  HDL hardware description languages
  HARQ hybrid automatic repeat request
  IE information element
  LAA licensed assisted access
  LTE long term evolution
  MCG master cell group
  MeNB master evolved node B
  MIB master information block
  MAC media access control
  MME mobility management entity
  NAS non-access stratum
  OFDM orthogonal frequency division multiplexing
  PDCP packet data convergence protocol
  PDU packet data unit
  PHY physical
  PDCCH physical downlink control channel
  PHICH physical HARQ indicator channel
  PUCCH physical uplink control channel
  PUSCH physical uplink shared channel
  PCell primary cell
  PCC primary component carrier
  PSCell primary secondary cell
  pTAG primary timing advance group
  QAM quadrature amplitude modulation
  QPSK quadrature phase shift keying
  RBG Resource Block Groups
  RLC radio link control
  RRC radio resource control
  RA random access
  RB resource blocks
  SCC secondary component carrier
  SCell secondary cell
  Scell secondary cells
  SCG secondary cell group
  SeNB secondary evolved node B
  sTAGs secondary timing advance group
  SDU service data unit
  S-GW serving gateway
  SRB signaling radio bearer
  SC-OFDM single carrier-OFDM
  SFN system frame number
  SIB system information block
  TAI tracking area identifier
  TAT time alignment timer
  TDD time division duplexing
  TDMA time division multiple access
  TA timing advance
  TAG timing advance group
  TB transport block
  UL uplink
  UE user equipment
  VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
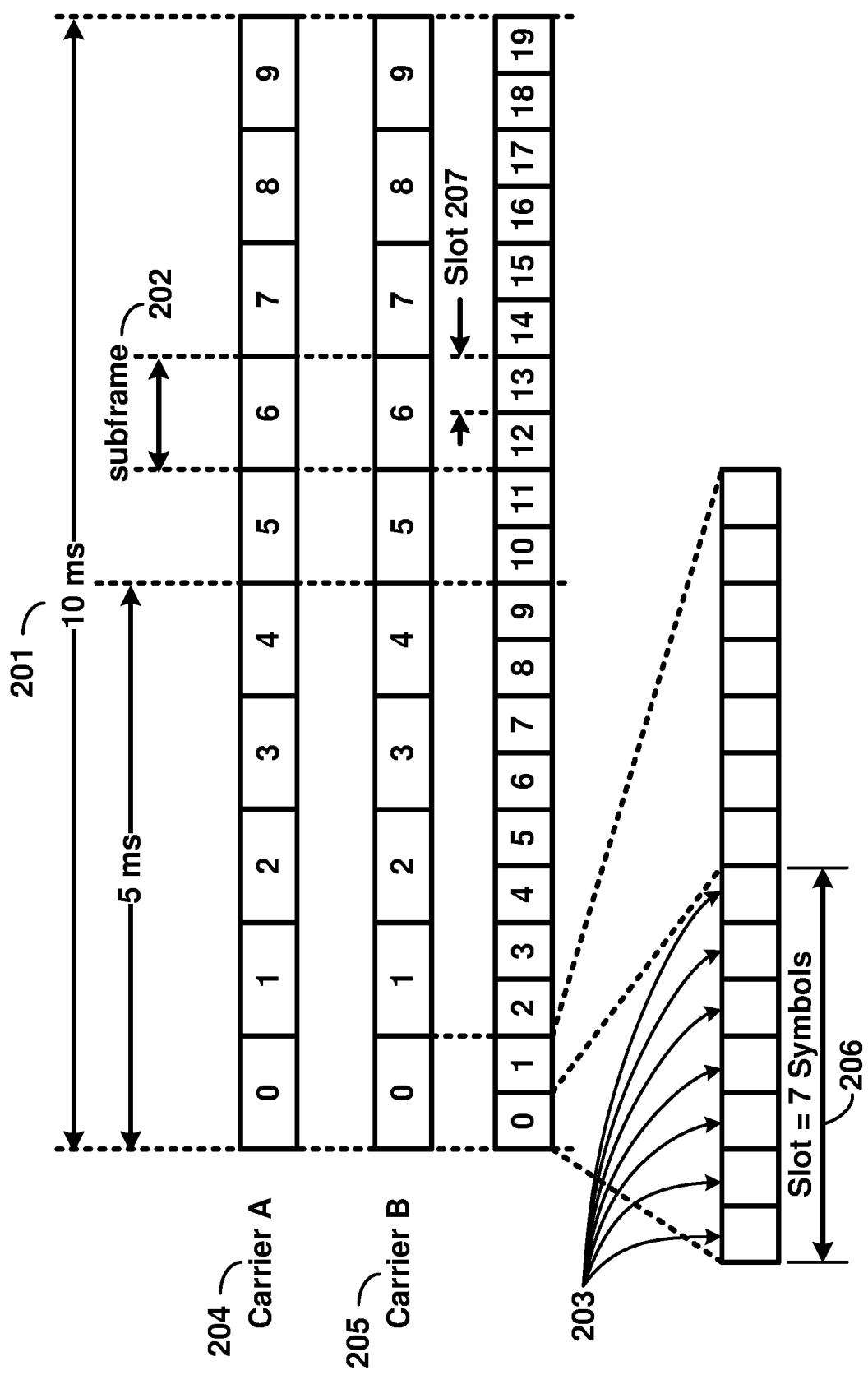
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
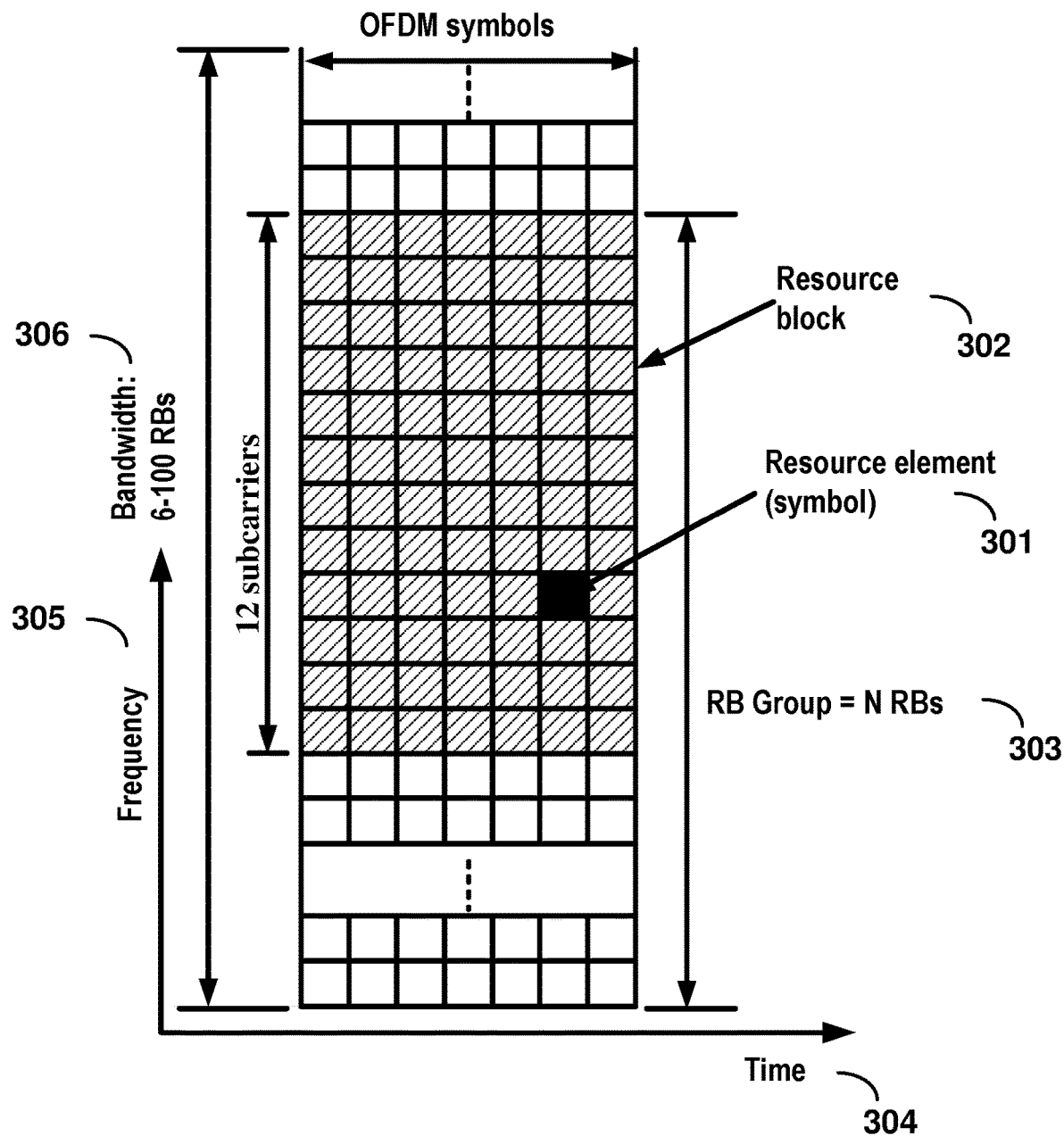
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
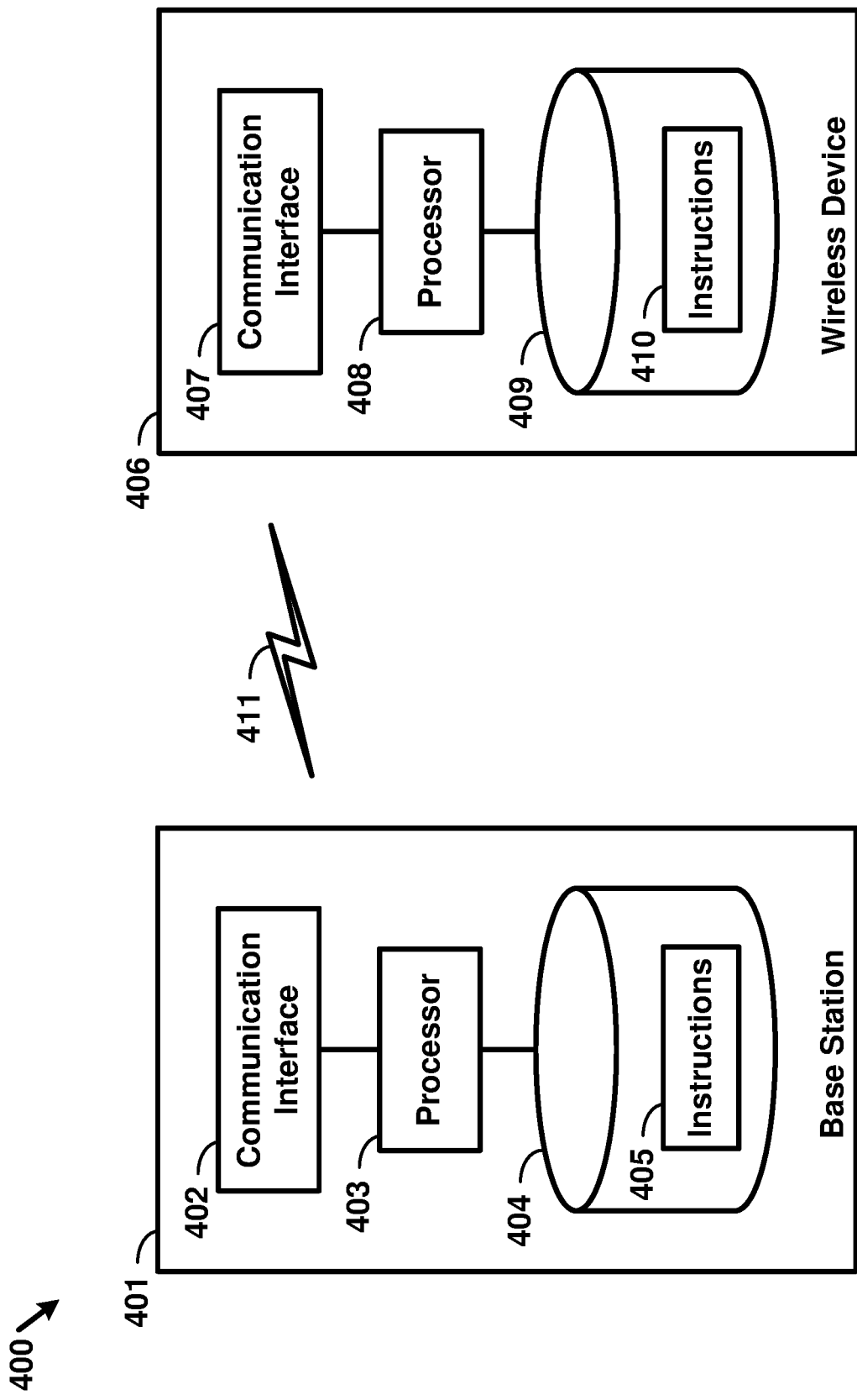
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
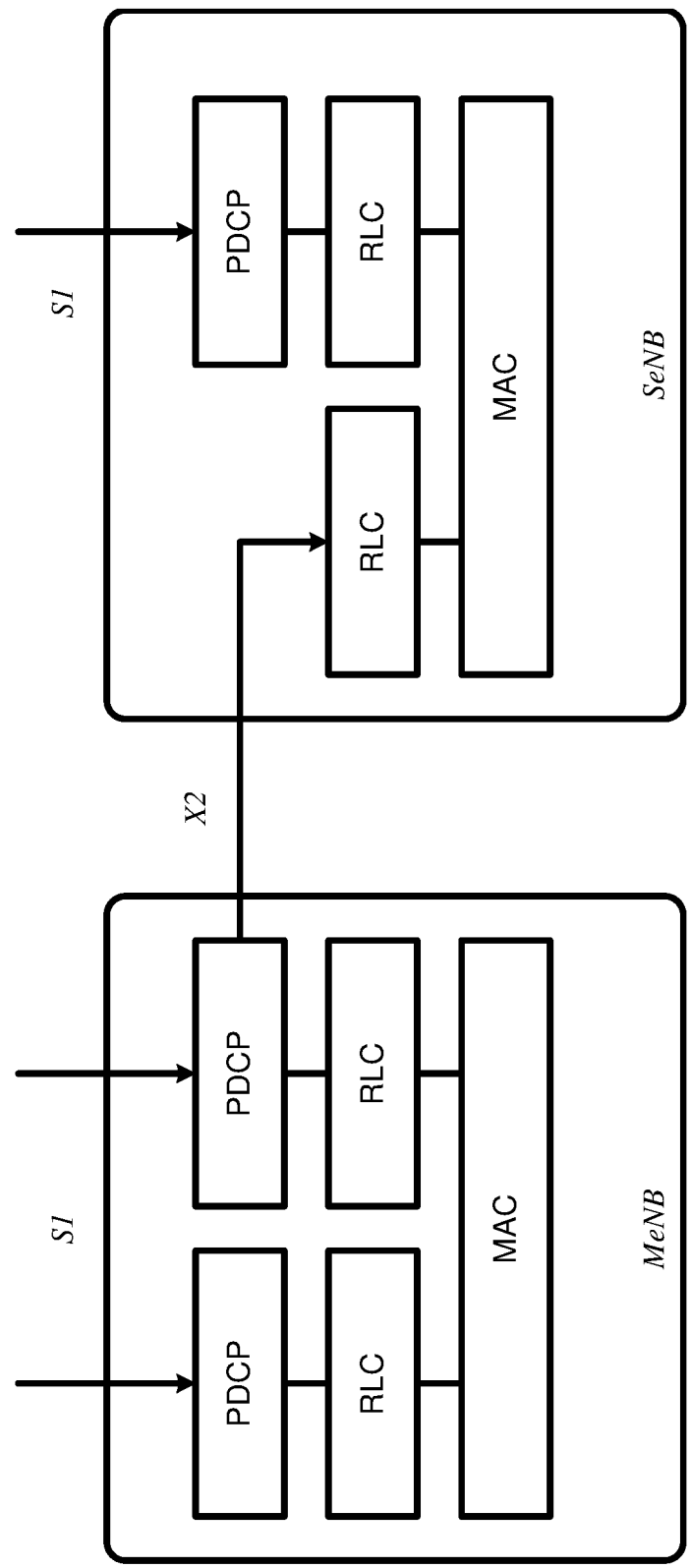
FIG. 6 is an example diagram for a protocol structure with CA and DC as per an aspect of an embodiment of the present disclosure.
Figure 7:
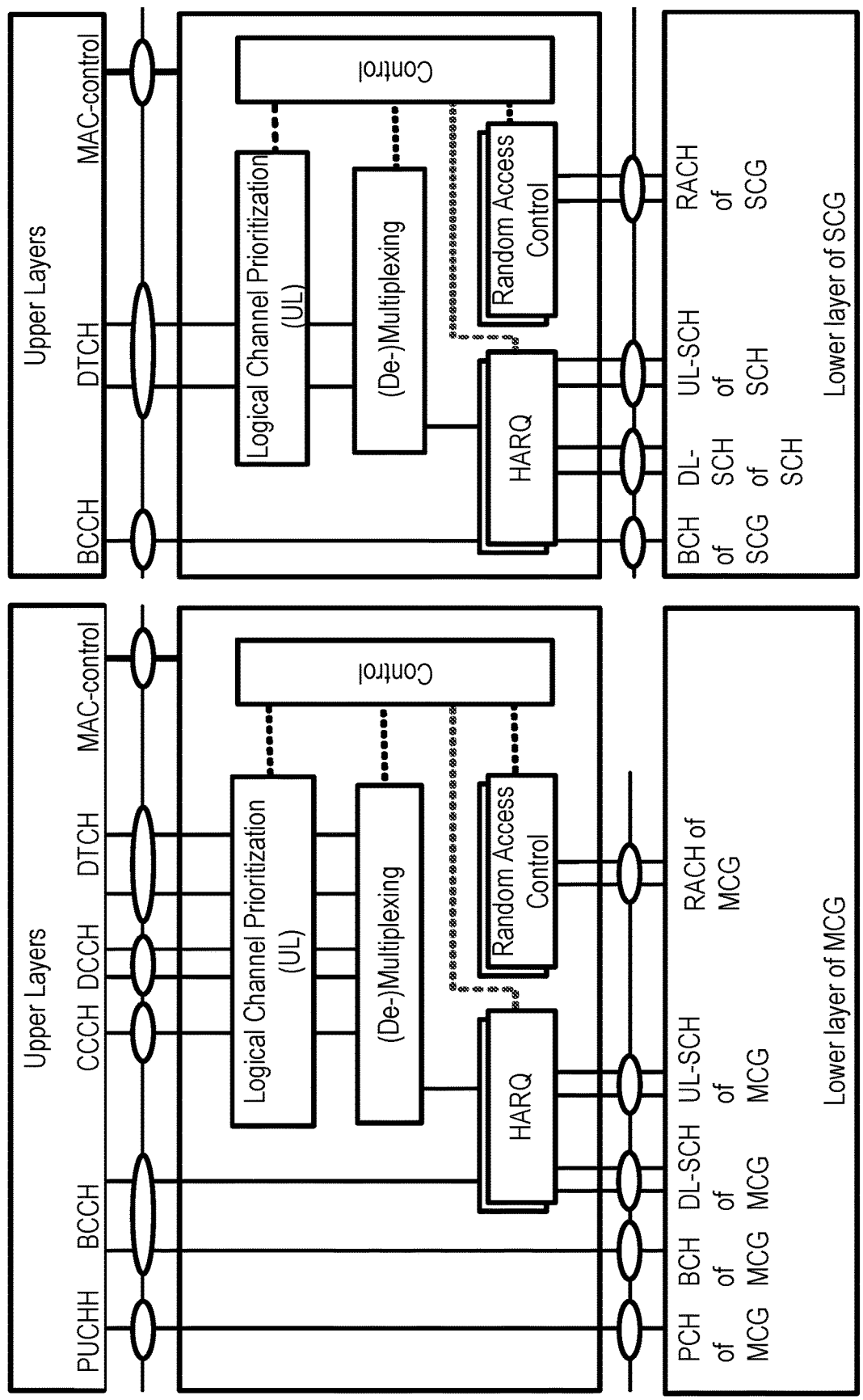
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
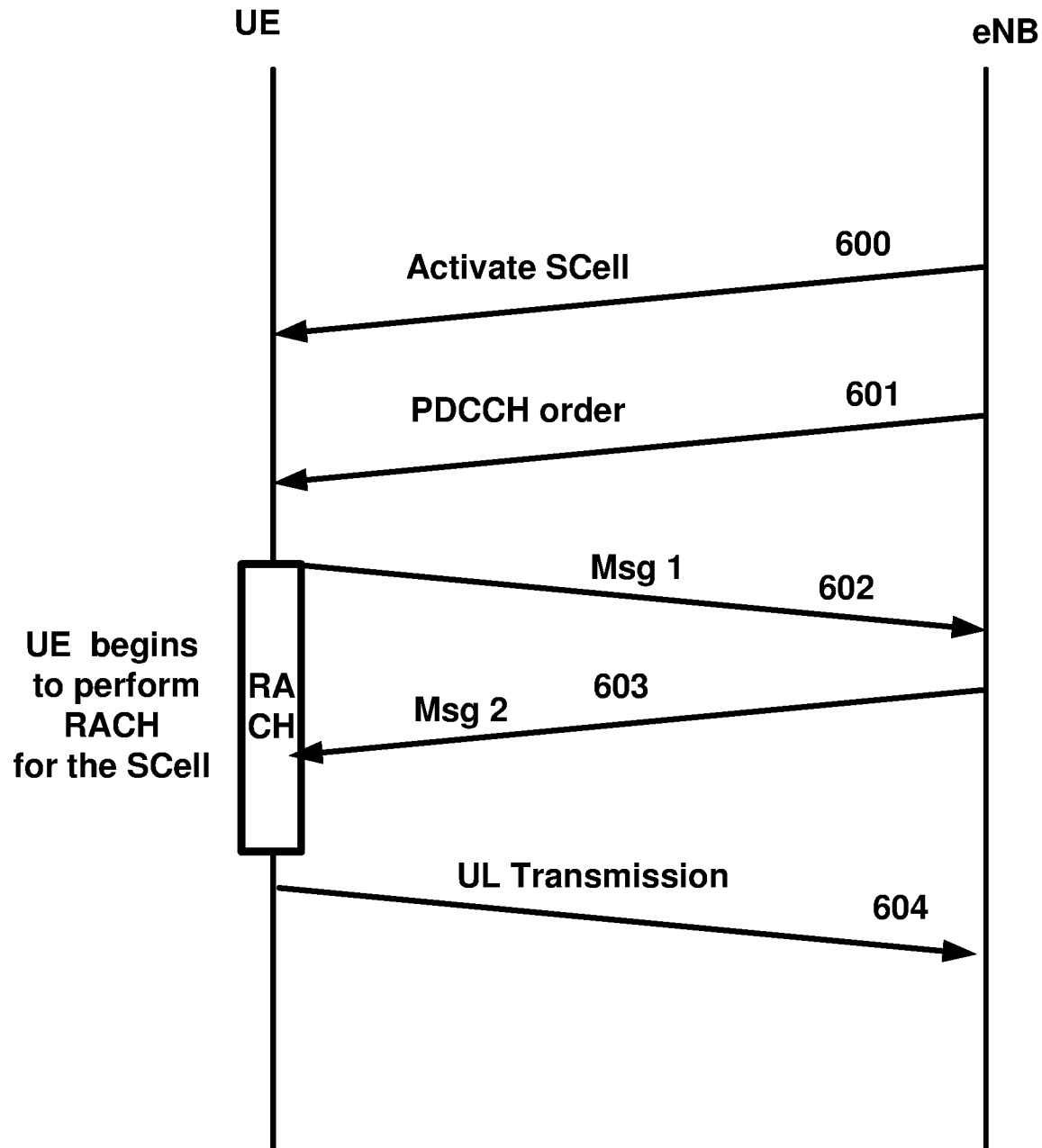
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group.

SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
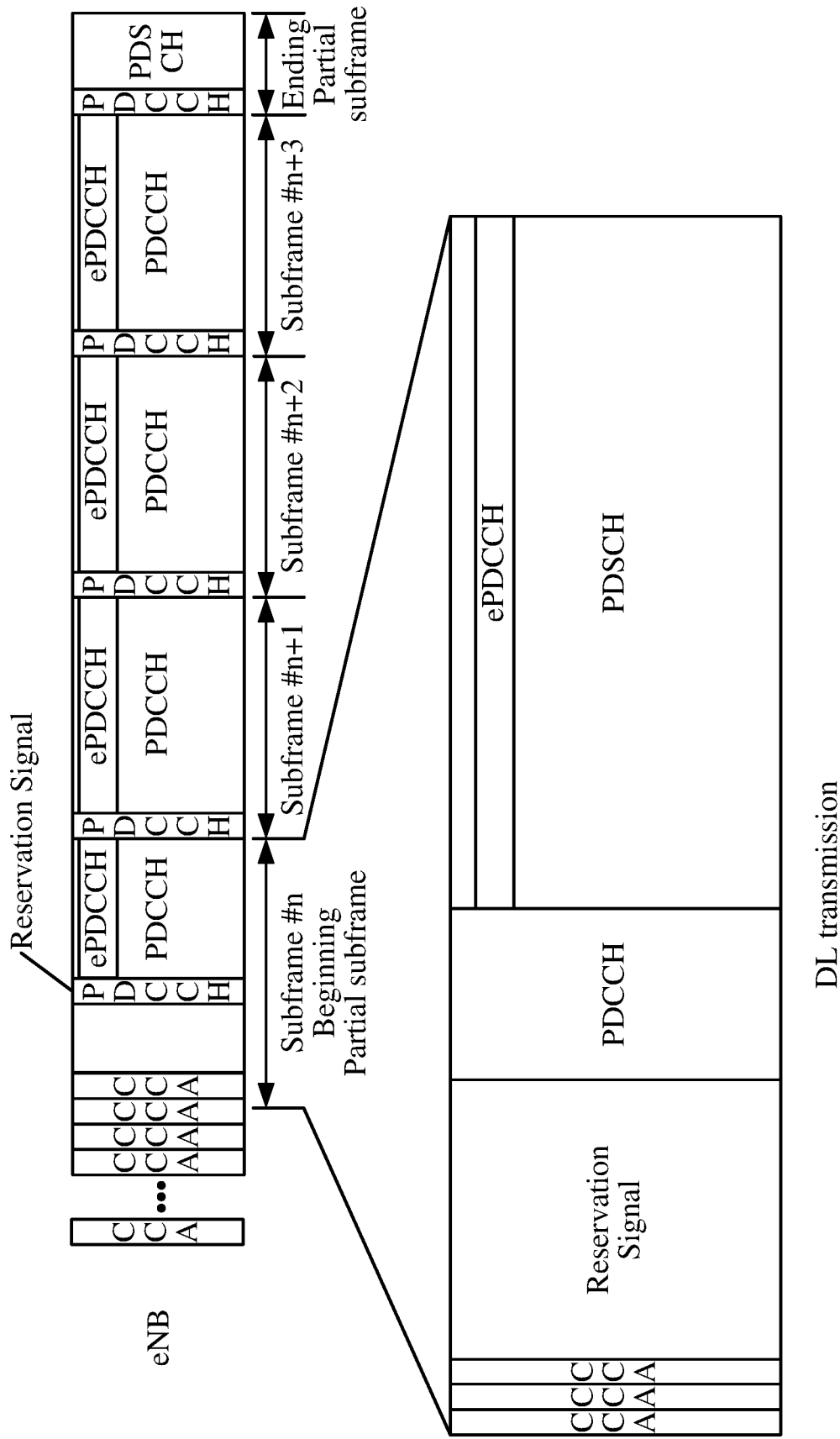
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

A category 4 LBT mechanism may be the baseline at least for LAA DL transmission bursts containing PDSCH. CCA may end regardless of subframe boundary when Category 4 LBT mechanism is applied. A reservation signal may be transmitted when CCA ends. A DL data transmission may start without waiting until the next subframe boundary especially when maximum DL transmission burst duration is short (e.g. max 4 ms burst). In an example embodiment, the start timings of OFDM symbols may have limited possibilities for example at slot boundaries.

There may be a time gap between CCA end and start timing of DL data transmission. An eNB may transmit the reservation signal during this time gap. A UE may perform blind decoding to detect the start timing of DL data transmission at candidate timings. In an example, an initial signal may be defined to notify the start timing of DL data transmission. An initial signal may be PSS/SSS within one or two OFDM symbol(s) or some variation of PSS/SSS combined with other signals (e.g. CRS, CSI-RS). Various alternative signal formats and duration may be implemented for the reservation signal and the initial signal.

An LAA cell may be configured for uplink transmission. In an example, a UE may receive a grant for uplink transmission. The UE may need to perform LBT before transmitting uplink signals. Uplink transmission may be scheduled by self scheduling and/or cross scheduling.

Followings are example implementation options for implementing an LAA cell. One or more of these features may for example be implemented for downlink and/or uplink transmission. Some of the features disclosed in the example embodiments are optional.

In an example, if a DL transmission burst with PDSCH is transmitted, for which channel access has been obtained using LBT priority class X (1 . . . 4), the eNB may consider the following. The transmission duration may not be longer than the minimum possible duration needed to transmit available buffered traffic corresponding to LBT priority classes≤X. The transmission duration may not be longer than the MCOT for priority class X. Additional traffic corresponding to LBT priority classes>X may be included in the DL transmission burst once inclusion of traffic corresponding to LBT priority classes≤X has been exhausted. In such cases, the eNB may maximise occupancy of the remaining transmission resources in the DL transmission burst with this additional traffic.

Frame structure type 3 is applicable to LAA secondary cell operation with normal cyclic prefix. A radio frame is $T_f=307200 \cdot T_s=10$ ms long and comprises of 20 slots of length $T_{slot}=15360 \cdot T_s=0.5$ ms, numbered from 0 to 19. A subframe may be defined as two consecutive slots where subframe i comprises of slots 2i and 2i+1. The 10 subframes within a radio frame may be available for downlink transmissions. Downlink transmissions occupy one or more consecutive subframes, starting anywhere within a subframe and ending with the last subframe either fully occupied or following one of the DwPTS durations. In release 14 and/or beyond, Frame structure 3 may be used for both uplink or downlink transmission.

An eNB operating LAA Scell(s) may perform the channel access procedures for accessing the channel(s) on which the LAA Scell(s) transmission(s) are performed. Example channel access procedure may be performed for transmission(s) including PDSCH. The eNB may transmit a transmission including PDSCH on a channel on which LAA Scell(s) transmission(s) are performed, after sensing the channel to be idle during the slot durations of a defer duration $T_d$; and after the counter N is zero in mechanism 4. In an example implementation, the counter N is adjusted by sensing the channel for additional slot duration(s) according to the mechanisms below:

1) set $N=N_{init}$, where $N_{init}$ is a random number uniformly distributed between 0 and $CW_p$; 2) if N>0 and the eNB chooses to decrement the counter, set N=N-1; 3) sense the channel for an additional slot duration, and if the additional slot duration is idle, go to mechanism 4; else, go to mechanism 5; 4) if N=0, stop; else, go to mechanism 2. 5) sense the channel during the slot durations of an additional defer duration $T_d$; 6) if the channel is sensed to be idle during the slot durations of the additional defer duration $T_d$, go to mechanism 2; else, go to mechanism 5.

If an eNB has not transmitted a transmission including PDSCH on a channel on which LAA Scell(s) transmission(s) are performed after mechanism 4 in the procedure above, the eNB may transmit a transmission including PDSCH on the channel, after sensing the channel to be idle at least in the slot durations of an additional defer duration $T_d$.

In an example, the defer duration $T_d$ may comprise of duration $T_f=16$ us immediately followed by $m_p$ consecutive slot durations where a slot duration is $T_{sl}=9$ us, and $T_f$ may include an idle slot duration $T_{sl}$ at start of $T_f$.

A slot duration $T_{sl}$ may be considered to be idle if the eNB senses the channel during the slot duration, and the power detected by the eNB for at least 4 us within the slot duration is less than energy detection threshold $X_{Thresh}$. Otherwise, the slot duration $T_{sl}$ may be considered to be busy.

In an example, $CW_{min,p} \leq CW_p \leq CW_{max,p}$ is the contention window. $CW_p$ adjustment is a contention window. $CW_{min,p}$ and $CW_{max,p}$ are chosen during mechanism 1 of the procedure above. $m_p$, $CW_{min,p}$, and $CW_{max,p}$ are based on channel access priority class associated with the eNB transmission. $X_{Thresh}$ is an adjustment factor.

If the eNB transmits discovery signal transmission(s) not including PDSCH when N>0 in the procedure above, the eNB may not decrement N during the slot duration(s) overlapping with discovery signal transmission.

The eNB may not continuously transmit on a channel on which the LAA Scell(s) transmission(s) are performed, for a period exceeding $T_{m\ cot,p}$ as given in FIG. 11.

For p=3 and p=4, if the absence of any other technology sharing the carrier can be guaranteed on a long term basis (e.g. by level of regulation), $T_{m\ cot,p}=10$ ms, otherwise, $T_{m\ cot,p}=8$ ms.

In an example implementation, for LAA operation in Japan, if the eNB has transmitted a transmission after N=0 in mechanism 4 of the procedure above, the eNB may transmit the next continuous transmission, for duration of maximum $T_j=4$ msec, immediately after sensing the channel for at least a sensing interval of $T_{js}=34$ usec, if the power detected by the eNB during $T_{js}$ is less than $X_{Thresh}$, and if the total sensing and transmission time is not more than $1000 \cdot T_{mcot} + \lceil T_{mcot}/T_j \rceil \cdot T_{js}$ μsec.

Channel access procedure for transmissions including discovery signal transmission(s) and not including PDSCH.

An eNB may transmit a transmission including discovery signal but not including PDSCH on a channel on which LAA Scell(s) transmission(s) are performed immediately after sensing the channel for at least a sensing interval $T_{drs}=25$ us, if the power detected by the eNB during $T_{drs}$ is less than $X_{Thresh}$ and if the duration of the transmission is less than 1 ms.

In an example contention window adjustment procedure, if the eNB transmits transmissions that are associated with channel access priority class p on a channel, the eNB may maintain and adjust the contention window value $CW_p$ for those transmissions using the following mechanisms in an example: 1) for a priority class $p \in \{1, 2, 3, 4\}$ set $CW_p = CW_{min,p}$. 2) if at least Z=80% of HARQ-ACK values corresponding to PDSCH transmission(s) in reference subframe k are determined as NACK, increase $CW_p$ for a priority class $p \in \{1,2,3,4\}$ to the next higher allowed value; otherwise, go to mechanism 1. Reference subframe k is the starting subframe of the most recent transmission on the channel made by the eNB, for which HARQ-ACK feedback is available. If $CW_p = CW_{max,p}$, the next higher allowed value for adjusting $CW_p$ is $CW_{max,p}$.

For determining Z, if the eNB transmission(s) for which HARQ-ACK feedback is available start in the second slot of subframe k HARQ-ACK values corresponding to PDSCH transmission(s) in subframe k+1 may also be used in addition to the HARQ-ACK values corresponding to PDSCH transmission(s) in subframe k. 'DTX' state and 'any' state may be counted as NACK, if the HARQ-ACK values corresponding to the PDSCH transmission(s) are assigned by (E)PDCCH transmitted on the channel. If a PDSCH transmission has two codewords, the HARQ-ACK value of a codeword may be considered separately. Bundled HARQ-ACK across M subframes may be considered as M HARQ-ACK responses. If the $CW_p = CW_{max,p}$ is consecutively used K times for generation of $N_{init}$, $CW_p$, is reset to $CW_{min,p}$ for a priority class $p \in \{1,2,3,4\}$. K is selected by eNB from the set of values $\{1, 2, \ldots, 8\}$.

In an example energy detection threshold adaptation procedure, an eNB accessing a channel on which LAA SCell(s) transmission(s) are performed, may set the energy detection threshold ($X_{Thresh}$) to be less than or equal to the maximum energy detection threshold $X_{Thresh\_max}$. In an example, $X_{Thresh\_max}$ is determined as follows. If the absence of any other technology sharing the carrier can be guaranteed on a long term basis (e.g. by level of regulation) then:

$$X_{Thresh\_max} = \min \left\{ \begin{array}{c} T_{max} + 10 \text{ dB,} \\ X_r \end{array} \right\}.$$

$X_r$ is Maximum energy detection threshold defined by regulatory requirements in dBm when such requirements are defined, otherwise $X_r = T_{max} + 10$ dB. Otherwise, $$X_{Thresh\_max} = \max \left\{ \begin{array}{c} -72 \text{ dBm(20 MHz),} \\ \min \left\{ \begin{array}{c} T_{max}, \\ T_{max} - T_A + (P_H - P_{TX}) \end{array} \right\} \end{array} \right\}.$$

Where in an example: $T_A = 10$ dB for transmission(s) including PDSCH; $T_A = 5$ dB for transmissions including discovery signal transmission(s) and not including PDSCH; $P_H = 23$ dBm; $P_{TX}$ is the set maximum eNB output power in dBm for the carrier. The eNB may use the set maximum transmission power over a single carrier irrespective of whether single carrier or multi-carrier transmission is employed.

$T_{max}$(dBm)=10·log 10(3.16228·$10^{-8}$ (mW/MHz)·BWMHz (MHz)). BWMHz is the single channel bandwidth in MHz.

Example embodiments describe channel access procedure for transmission(s) on multiple channels using cell grouping. In an example embodiment, an eNB may access multiple channels on which LAA Scell(s) transmission(s) are performed, according to one of the Type A or Type B procedures.

In an example, Type A multi-channel access procedures may be implemented. The eNB may perform channel access on a channel $c_i \in Cx$, where Cx is a set of channels on which the eNB intends to transmit in cell group x, and i=0, 1, . . . $q_x-1$, and $q_x$ is the number of channels on which the eNB intends to transmit in Cx. In an example embodiment, LAA cells may be grouped into X cell group, wherein X could be 1, 2, 3, etc. A device may be able to support up to X max cell groups. $c_i$ and $c_j$ (and cells with an index, $c_x$) in example embodiments belong to the same cell group.

A UE may transmit an RRC message to the eNB indicating the cell groups the UE supports and/or the maximum supported cell groups. In an example, an eNB may intend to transmit on LAA cells from X cell groups, e.g. C1 to CX. In an example, an eNB may intend to transmit on two cells from a first cell group and two other cells from a second cell groups.

The access mechanisms described in the example embodiments are independent in different cell groups. An eNB may transmit an RRC message comprising configuration parameters of different cell groups. In an example embodiments, cells within different cell groups may be preconfigured, depending on their frequencies, bands, hardware limitations, etc.

The current access procedures is inefficient when it is applied to different cell groups. Dependencies on different LAA cell channel access procedures may reduce transmission efficiency. Grouping may allow an eNB to implement at least one or more parameters in the channel access procedure for cell based on the cell group that the cell is associated with and based on at least some of the parameters of other cells in the same cell group. Grouping as described in the example embodiments improve transmission efficiency and flexibility across multiple cell groups and may enable the eNB and UE to transmit and receive packets across multiple cell groups employing larger number of activated cells.

Some of the channel access parameters may be group specific and may be configured different values for different groups. For example, at least some of the parameters such as slot duration, deferral period, threshold values, counters and/or contention windows may be configured differently for each group. This provides flexibility to implement efficient access procedures designed for a cell group.

FIG. 12 shows two examples. In Example 1 LAA cells are grouped in two groups. Each group may employ its own configuration parameters (e.g. thresholds, offset, timer, and/or counters) and a base station may implement a first channel access procedure considering cells in LAA group 1 and a second channel access procedure considering cells in LAA group 2. Example 2 shows a second example wherein LAA cells are grouped into three groups. Other examples with different number of cell groups and different number of cells in a cell group may be provided.

In an example, the counter N described is determined for a channel $c_i$ and is denoted as $N_{c_i}$. $N_{c_i}$ is maintained according to below examples.

In an example, a UE may implement a Type A1 channel access procedure. Counter N as described in the Example Channel access procedures for LAA is independently determined for a channel $c_i$ and is denoted as $N_{c_i}$. If the absence of any other technology sharing the carrier cannot be guaranteed on a long term basis (e.g. by level of regulation), when the eNB ceases transmission on any one channel $c_j \in Cx$, for a channel $c_i \neq c_j$, the eNB can resume decrementing $N_{c_i}$ when idle slots are detected either after waiting for a duration of $4 \cdot T_{sl}$, or after reinitialising $N_{c_i}$.

In an example, a UE may implement a Type A2 channel access procedure. Counter N is determined as described in the Example Channel access procedures for LAA for channel $c_j \in C_x$, and is denoted as $N_{c_j}$, where $c_j$ is the channel that has the largest $CW_p$ value in the cell group Cx. For a channel $c_i$, $N_{c_i} = N_{c_j}$. If the absence of any other technology sharing the carrier cannot be guaranteed on a long term basis (e.g. by level of regulation), when the eNB ceases transmission on any one channel for which $N_{c_i}$ may be determined, the eNB may reinitialise $N_{c_i}$ for channels.

In an example, a Type B multi-channel access procedure may be implemented. A channel $c_j \in C_x$ is selected by the eNB as follows: the eNB selects $c_j$ by uniformly randomly choosing $c_j$ from Cx before a transmission on multiple channels $c_i \in Cx$, or the eNB selects $c_j$ no more frequently than once every 1 second, where Cx is a set of channels on which the eNB intends to transmit in a given cell group x, i=0, 1, ... $q_x$–1, and $q_x$ is the number of channels on which the eNB intends to transmit in a given cell group x. To transmit on channel $c_j$: the eNB may perform channel access on channel $c_j$ according to the procedures described in the Example Channel access procedures for LAA with the modifications described here.

To transmit on channel $c_i \neq c_j$, $c_i \in C_x$: for a channel $c_i$, the eNB may sense the channel $c_i$ for at least a sensing interval $T_{mc} = 25$ us immediately before the transmitting on channel $c_j$, and the eNB may transmit on channel $c_i$ immediately after sensing the channel $c_i$, if the power detected by the eNB on channel $c_i$ during $T_{mc}$ is less than $X_{Thresh}$.

In an example, A UE may implement Type B1 channel access procedure. For determining $CW_p$ of channel $c_j$, mechanism 2 of the procedure is modified as follows: if at least Z=80% of HARQ-ACK values corresponding to PDSCH transmission(s) in reference subframe k of all channels $c_i \in C_x$ are determined as NACK, increase $CW_p$ of channel $c_j$ for a priority class $p \in \{1,2,3,4\}$ to the next higher allowed value; otherwise, go to mechanism 1.

In an example, A UE may implement Type B2 channel access procedure. A $CW_p$ value is maintained independently for a channel $c_i \in C_x$. For determining $N_{init}$ for channel $c_j$, $CW_p$ value of channel $c_{j1} \in C_x$ is used, where $C_{j1}$ is the channel with largest $CW_p$ among all channels in set Cx.

According to various embodiments, a device such as, for example, a wireless device, a base station and/or the like, may comprise one or more processors and memory. The memory may store instructions that, when executed by the one or more processors, cause the device to perform a series of actions. Embodiments of example actions are illustrated in the accompanying figures and specification.

Figure 13:
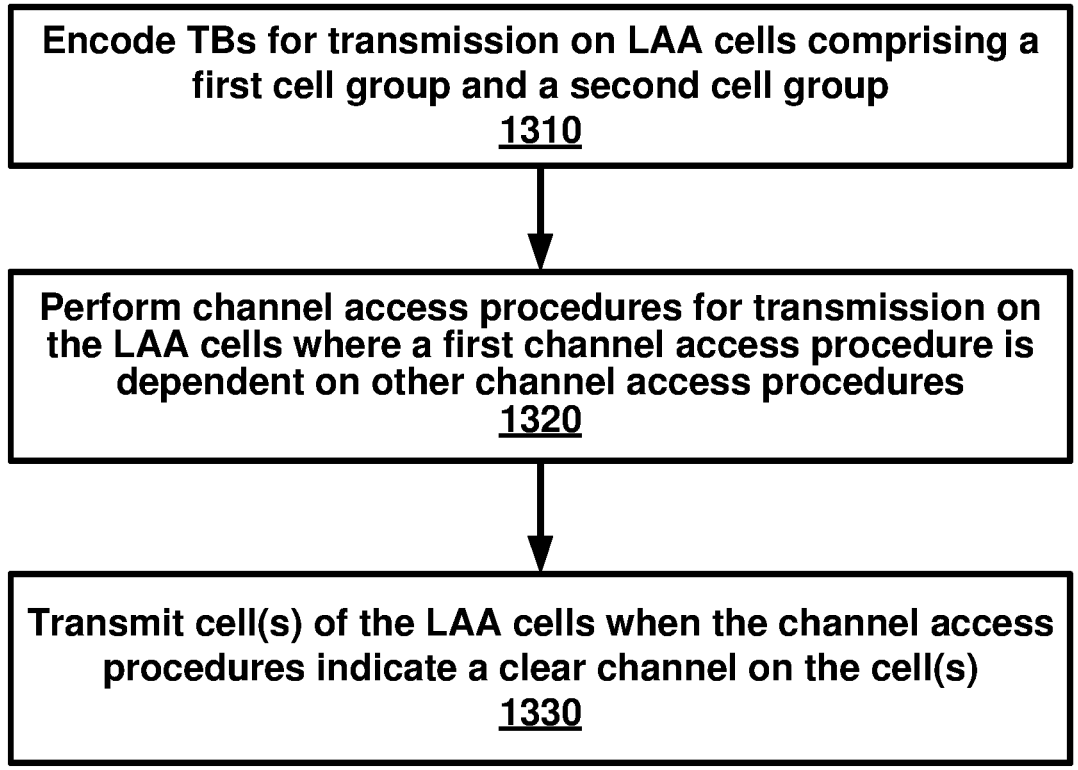
FIG. 13 is an example flow diagram as per an aspect of an embodiment of the present disclosure.

FIG. 13 is an example flow diagram as per an aspect of an embodiment of the present disclosure. At 1310, a base station may encode a plurality of transport blocks (TBs) for transmission on a plurality of licensed assisted access (LAA) cells. The plurality of LAA cells may comprise: a first cell group and a second cell group. The first cell group may comprise one or more first LAA cells. The second cell group may comprise one or more second LAA cells. At 1320, the base station may perform channel access procedures for transmission on the plurality of LAA cells. The channel access procedures may comprise a first channel access procedure of a first cell of the first cell group. The first channel access procedure may be: dependent on a second channel access procedure of a second cell of the first cell group, and independent of a third channel access procedure of a third cell of the second cell group. At 1330, the base station may transmit on one or more cells of the plurality of LAA cells when the channel access procedures indicate a clear channel on the one or more cells.

According to an embodiment, the base station may receive one or more messages indicating one or more supported cell groups comprising the first cell group and the second cell group. The first cell group may, for example, employ a first multi-carrier access procedure type and the second cell group may employ a second multi-carrier access procedure type. At least one of the channel access procedures may be, for example, a multi-carrier access procedure type A or a multi-carrier access procedure type B.

According to an embodiment, the base station may further transmit one or more radio resource control (RRC) messages comprising configuration parameters of the plurality of LAA cells. The first cell group and the second cell group may be, for example, preconfigured in the base station. The first cell group may comprise, for example, the one or more first LAA cells of a first frequency band. The second cell group may comprise, for example, the one or more second LAA cells of a second frequency band. The one or more first channel access parameters of the first cell group may be, for example, configured differently from second channel access parameters of the second cell group.

According to an embodiment, the channel access procedures on the one or more first LAA cells may employ, for example, a first threshold. The channel access procedures on the one or more second LAA cells may employ, for example, a second threshold different from the first threshold.

According to an embodiment, the channel access procedures comprise series of actions. The base station may select the second cell uniformly randomly from the first cell group. A first listen before talk (LBT) procedure may be performed on the second cell employing a long monitoring period. A second LBT procedure may be performed on the first cell in the first cell group employing a short monitoring period. The base station may transmit on the second cell if the second LBT procedure indicates a clear channel. The base station may transmit on the first cell when the first LBT procedure and the second LBT procedure indicate a clear channel.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a base station, one or more messages indicating support for a plurality of unlicensed frequency bands;
   encoding, by the base station, a plurality of transport blocks (TBs) for transmission on a plurality of licensed assisted access (LAA) cells operating in the plurality of unlicensed frequency bands;
   performing, by the base station, listen before talk (LBT) procedures for transmission on the plurality of LAA cells, the LBT procedures comprising a first LBT procedure of a first LAA cell, a second LBT procedure of a second LAA cell, and a third LBT procedure of a third LAA cell, the first LBT procedure being:
      dependent on the second LBT procedure of the second LAA cell in a same unlicensed frequency band as the first LAA cell; and
      independent of the third LBT procedure of the third LAA cell in a different unlicensed frequency band than the first LAA cell; and
   transmitting, on one or more cells of the plurality of LAA cells when the LBT procedures indicate a clear channel on the one or more cells.

2. The method of claim 1, wherein a first group of LAA cells, in an unlicensed frequency band that includes the first LAA cell and the second LAA cell, employs a first multi-carrier access procedure type and a second group of LAA cells, in an unlicensed frequency band that includes the third LAA cell, employs a second multi-carrier access procedure type.

3. The method of claim 1, wherein at least one of the LBT procedures is a multi-carrier access procedure type A or a multi-carrier access procedure type B.

4. The method of claim 1, further comprising transmitting one or more radio resource control (RRC) messages comprising configuration parameters of the plurality of LAA cells.

5. The method of claim 1, wherein a first group of LAA cells, in an unlicensed frequency band that includes the first LAA cell and the second LAA cell, and a second group of LAA cells, in the unlicensed frequency band that includes the third LAA cell, are pre-configured in the base station.

6. The method of claim 1, wherein:
   a first cell group comprises first LAA cells of an unlicensed frequency band that includes the first LAA cell and the second LAA cell; and
   a second cell group comprises second LAA cells of an unlicensed frequency band that includes the third LAA cell.

7. The method of claim 6, wherein one or more first channel access parameters of the first cell group are configured differently from second channel access parameters of the second cell group.

8. The method of claim 6, wherein:
LBT procedures on the first LAA cells employ a first threshold; and
LBT procedures on the second LAA cells employ a second threshold different from the first threshold.

9. The method of claim 6, wherein the LBT procedures comprise:
selecting the second LAA cell uniformly randomly from the first cell group;
performing the second LBT procedure on the second LAA cell employing a long monitoring period;
performing the first LBT procedure on the first LAA cell employing a short monitoring period;
transmitting on the second LAA cell based on the second LBT procedure indicating a clear channel; and
transmitting on the first LAA cell based on the first LBT procedure and the second LBT procedure indicating a clear channel.

10. A base station comprising:
one or more processors; and
memory storing instructions that, when executed by the one or more processors, cause the base station to:
receive one or more messages indicating support for a plurality of unlicensed frequency bands;
encode a plurality of transport blocks (TBs) for transmission on a plurality of licensed assisted access (LAA) cells operating in the plurality of unlicensed frequency bands;
perform listen before talk (LBT) procedures for transmission on the plurality of LAA cells, the LBT procedures comprising a first LBT procedure of a first LAA cell, a second LBT procedure of a second LAA cell, and a third LBT procedure of a third LAA cell, the first LBT procedure being:
dependent on the second LBT procedure of the second LAA cell in a same unlicensed frequency band as the first LAA cell; and
independent of the third LBT procedure of the third LAA cell in a different unlicensed frequency band than the first LAA cell; and
transmit on one or more cells of the plurality of LAA cells when the LBT procedures indicate a clear channel on the one or more cells.

11. The base station of claim 10, wherein a first group of LAA cells, in an unlicensed frequency band that includes the first LAA cell and the second LAA cell, employs a first multi-carrier access procedure type and a second group of LAA cells, in an unlicensed frequency band that includes the third LAA cell, employs a second multi-carrier access procedure type.

12. The base station of claim 10, wherein at least one of the LBT procedures is a multi-carrier access procedure type A or a multi-carrier access procedure type B.

13. The base station of claim 10, wherein the instructions, when executed, further cause the base station to transmit one or more radio resource control (RRC) messages comprising configuration parameters of the plurality of cells.

14. The base station of claim 10, wherein a first group of LAA cells, in an unlicensed frequency band that includes the first LAA cell and the second LAA cell, and a second group of LAA cells, in an unlicensed frequency band that includes the third LAA cell, are pre-configured in the base station.

15. The base station of claim 10, wherein:
a first cell group comprises first LAA cells of an unlicensed frequency band that includes the first LAA cell and the second LAA cell; and
a second cell group comprises second LAA cells of an unlicensed frequency band that includes the third LAA cell.

16. The base station of claim 15, wherein one or more first channel access parameters of the first cell group are configured differently from second channel access parameters of the second cell group.

17. The base station of claim 15, wherein:
LBT procedures on the first LAA cells employ a first threshold; and
LBT procedures on the second LAA cells employ a second threshold different from the first threshold.

18. The base station of claim 15, wherein the instructions for the channel access procedures further cause the base station to:
select the second LAA cell uniformly randomly from the first cell group;
perform the second LBT procedure on the second LAA cell employing a long monitoring period;
perform the first LBT procedure on the first LAA cell employing a short monitoring period;
transmit on the second LAA cell based on the second LBT procedure indicating a clear channel; and
transmit on the first LAA cell based on the first LBT procedure and the second LBT procedure indicating a clear channel.

* * * * *